United States Patent [19]

Miller

[11] Patent Number: 4,527,584

[45] Date of Patent: Jul. 9, 1985

[54] AUTOMATIC CONDENSATION DISCHARGER

[75] Inventor: Allan S. Miller, Hereford, England

[73] Assignee: Hiross International Corp., S.A., Luxembourg, Luxembourg

[21] Appl. No.: 399,014

[22] Filed: Jul. 16, 1982

[30] Foreign Application Priority Data

Aug. 21, 1981 [LU] Luxembourg ............................ 83505

[51] Int. Cl.³ ................................................ F16T 1/24
[52] U.S. Cl. .................................... 137/192; 137/434; 137/448; 137/451
[58] Field of Search ............... 137/192, 451, 448, 434; 73/317

[56] References Cited

U.S. PATENT DOCUMENTS

| 894,021 | 7/1908 | Lindstrom | 137/192 |
| 2,107,551 | 2/1938 | Simpson | 137/192 X |
| 2,216,000 | 9/1940 | Crawford | 251/DIG. 2 |
| 3,766,939 | 10/1973 | Reitman | 137/448 |

FOREIGN PATENT DOCUMENTS 848478  9/1960  United Kingdom ................ 137/451

Primary Examiner—Martin P. Schwadron
Assistant Examiner—Stephen M. Hepperle
Attorney, Agent, or Firm—Fishman & Dionne

[57] ABSTRACT

The condensation discharger comprises a tank (1) including a float (8) and an elastic cut-off blade (14) the blades of which being connected in such a way to the forked arm (6) of the float (8) that the discharge orifice is opened when the float is moved beyond a certain level.

22 Claims, 3 Drawing Figures

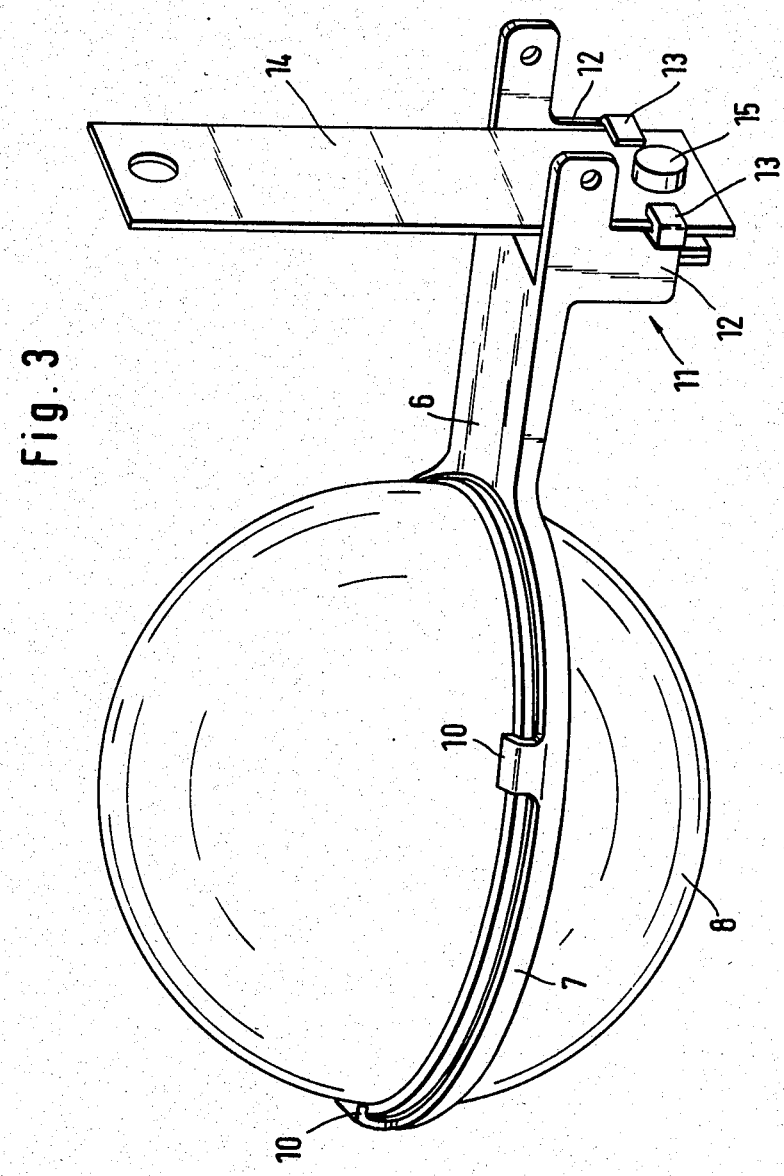

AUTOMATIC CONDENSATION DISCHARGER

The present invention relates to an automatic condensation discharger particularly suitable for use in installations for the treatment of air or other gases.

These devices are capable of revealing the presence of a condensation product, which is collected in a suitable vessel and when the liquid has risen to a certain preselected level the valve opens and the contents are discharged.

For a number of reasons, mainly connected with mechanical problems and inherent in the construction of the apparatus, the operation of these devices is frequently very delicate.

In practice the movement of the levers controlling the valve is subject to play, either owing to tolerances in their machining and assembly or by reason of wear, and this play causes them to function inaccurately or with difficulty.

The object of the invention is to provide a simple and reliable automatic condensation discharger.

A further object of the present invention is to provide a condensation discharger of which the cut-off is controlled by a float system designed in such a way as to remain unaffected by any clearance or wear.

Yet a further object of the invention is to provide a condensation discharger consisting of a combination of parts which are easy to assemble and which can also be removed and replaced, if necessary, without difficulty.

In accordance with the present invention there is provided an automatic condensation discharger comprising a tank serving for the discharge of the condensed liquid and containing a float connected by a forked arm to the structure of the tank itself, an elastic cut-off blade which closes the discharge nozzle, the said blade being inserted in the fork of the said arm and means acting on the said fork in the course of the ascending movement of the float beyond a certain level, and thus causing the discharge orifice to open.

Further features and advantages of the invention will emerge more clearly from the detailed description of a preferred embodiment of the invention, given by way of illustration but without any limitative effect and shown on the accompanying sheets of drawings, wherein:

FIG. 3 is an enlarged view, in perspective, of the various components of the invention.

Figure 1:
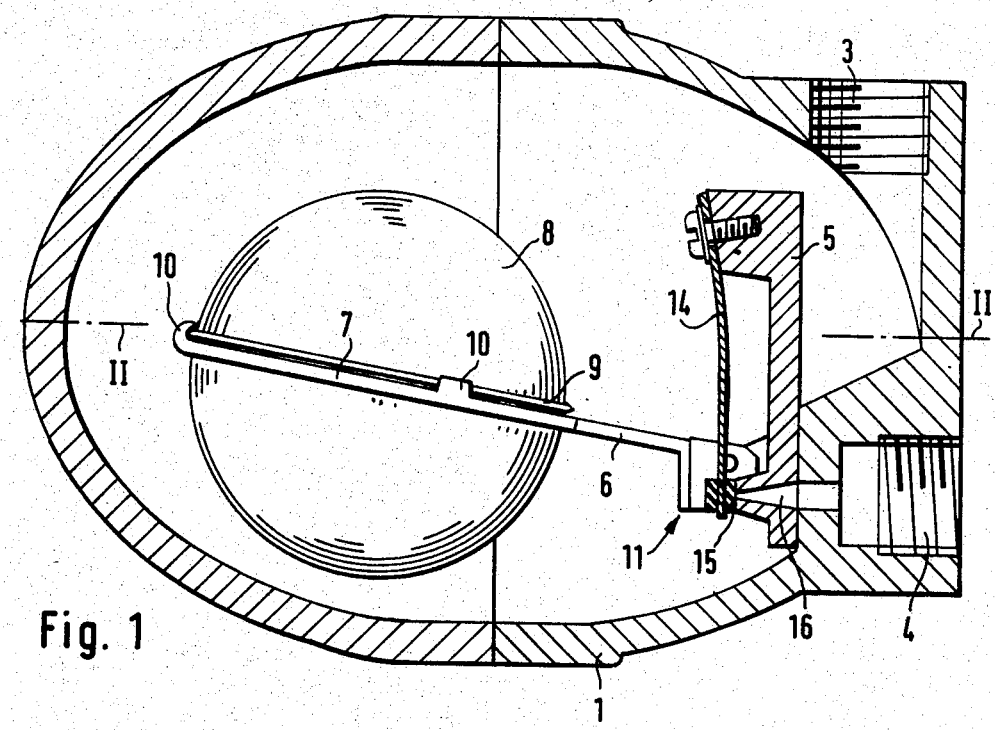
FIG. 1 is a view of the condensation discharger in section along a median vertical plane in respect of the position in which the discharge device is installed.
Figure 2:
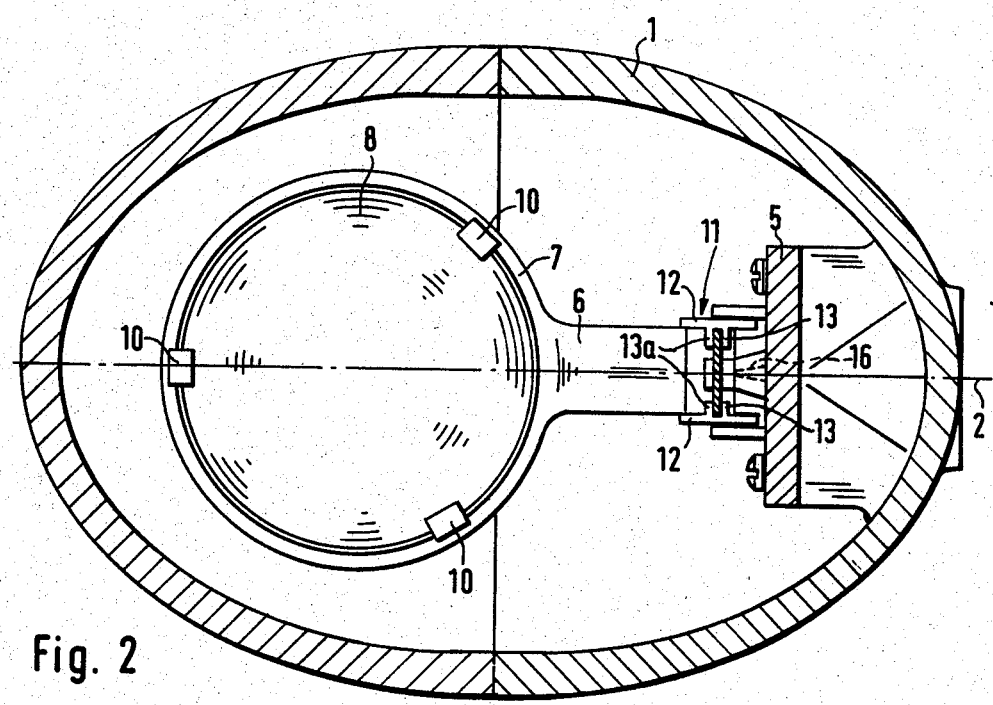
FIG. 2 is a view along the line II—II of FIG. 1.

Referring to the aforementioned drawings it may be seen that the discharge device forming the object of the invention consists of a bowl constituting a vessel 1, substantially ovoid in shape and positioned in the installation with its main axis 2 horizontal.

This bowl 1 is provided with the first coupling 3 which connects it to the installation from which the condensation is to be discharged and with a second coupling 4 by which the collected condensed product is discharged.

In the interior of the bowl 1 is a vertical support 5 which is associated with the structure of the bowl 1 and to which is articulated a forked arm 6 having a circular expanded part 7 into which is inserted a hollow sphere 8 provided with a diametral flange 9 engaging three elastic teeth 10 which render it integral with the arm 6.

The forked part 11 of the arm 6 is provided with two vertical appendages 12 positioned at an angle approximately 90° in relation to the arm. These appendages 12 each have two wings 13 and 13a respectively forming a seating into which is inserted an elastic blade 14 affixed by the top to the support 5 and provided in its lower part with a closure 15 which closes the orifice 16 of the discharge connection 4.

The blade 14 may be prestressed or affixed in such a manner as to force the closure device 15 against the orifice 16.

When the sphere 8 rises as a result of the accumulation of condensation liquid the wings 13 act on the elastic blade 14 and finally open the discharge orifice 16 until the level of the liquid has fallen back to a certain preselected limit at which the action of closing up the orifice 16 takes place.

It is obvious that the system in which the opening and closing operations are effected by the aid of a lever exerting no action on the closure device for the orifice is not subject to the effects arising out of clearance or play between components.

The fact is that the part forming the valve functions practically independently of the part forming the control; it may influence the level from which onwards the condensation is discharged but will have no effect on the hermeticity of the fitting.

In the closing phase, when the sphere 8 is descending, the wings 13a exerts a thrust on the elastic blade 14 and move the closure fitting 15 against the orifice 16, thus closing the latter.

The sphere and the arm may be constructed in any desired manner and from any suitable material.

From the point of view of their manufacture the components of the system are extremely simple, and this likewise applies to the operation of assembling the apparatus and, if necessary, removing and replacing the float.

The dimensions and materials adopted may obviously vary according to the needs arising.

I claim:

1. A liquid condensation discharger comprising:
a tank for collecting liquid condensation discharge, said tank having at least one inlet and one discharge orifice;
float assembly means pivotally disposed within said tank for controlling the flow of liquid condensation discharge out of said tank, said float assembly means comprising a hollow float of substantially spherical shape, an arm having a first end and a second end, said first end thereof being connected to said float, an elastic blade having one end thereof connected to said tank and the other end thereof connected to said arm and closure means disposed on said arm for opening and closing said outlet orifice in response to pivotal movement of said float assembly means;
a flange surrounding about the median of said substantially spherical float; and wherein
said first end of said arm includes an enlarged circular portion having means for retaining said float after said float has been inserted therein.

2. The condensation discharger of claim 1 wherein:
said second end of said arm is forked; and wherein
said elastic blade is connected to said arm between said forks.

3. The condensation discharger of claims 1 or 2 wherein said closure means is a closure fitting wherein a tight packing effects closure of said discharge orifice.

4. The condensation discharger of claims 1 or 2 wherein:
said elastic blade is prestressed thereby compressing said closure means against said discharge orifice to effect hermetic sealing.

5. The condensation discharger of claim 3 wherein:
said elastic blade is prestressed thereby compressing said closure fitting against said discharge orifice to effect hermetic sealing.

6. The condensation discharger of claim 1 wherein:
said retaining means comprises elastic teeth capable of engaging said flange.

7. The condensation discharger of claim 2 wherein:
each of said forks includes a substantially vertical appendage; and wherein:
each of said appendages have a first wing and a second wing, one of said first wings and one of said second wings together forming a seating for inserting said elastic blade therein.

8. The condensation discharger of claim 7 wherein:
said upwardly urged float causes said first wings to urge said elastic blade outwardly thereby opening said discharge orifice.

9. The condensation discharger of claim 7 wherein:
said downwardly urged float causes said second wings to urge said elastic blade inwardly thereby closing said discharge orifice.

10. The condensation discharger of claim 8 wherein:
said downwardly urged float causes said second wings to urge said elastic blade inwardly thereby closing said discharge orifice.

11. The condensation discharge of claims 1 or 2 including:
vertical support means, said support means being attached to said tank collection means; and wherein
a first end of said support means is attached to one end of said elastic blade and wherein a second end of said support means is attached to said second end of said arm.

12. A liquid condensation discharger comprising:
a tank for collecting liquid condensation discharge, said tank having at least one inlet and one discharge orifice;
float assembly means pivotally disposed within said tank for controlling the flow of liquid condensation discharge out of said tank, said float assembly means comprising a float, an arm having a first end and a second forked end, said first end thereof being connected to said float, an elastic blade having one end thereof connected to said tank and the other end thereof connected to said arm between said forks and closure means disposed on said arm for opening and closing said outlet orifice in response to pivotal movement of said float assembly means;
each of said forks including a substantially vertical appendage; and wherein:
each of said appendages has a first wing and a second wing, one of said first wings and one of said second wings together forming a seating for inserting said elastic blade therein.

13. The condensation discharger of claim 12 wherein said closure means is a closure fitting wherein a tight packing effects closure of said discharge orifice.

14. The condensation discharger of claim 12 wherein:
said elastic blade is prestressed thereby compressing said closure means against said discharge orifice to effect hermetic sealing.

15. The condensation discharger of claim 13 wherein:
said elastic blade is prestressed thereby compressing said closure fitting against said discharge orifice to effect hermetic sealing.

16. The condensation discharger of claim 12 wherein:
said float is hollow and has a substantially spherical shape.

17. The condensation discharger of claim 16 including:
a flange surrounding about the median of said sphere; and wherein:
said first end of said arm includes an enlarged circular portion having means for retaining said sphere after said sphere has been inserted therein.

18. The condensation discharger of claim 12 wherein:
said retaining means comprises elastic teeth capable of engaging said flange.

19. The condensation discharger of claim 12 wherein:
said upwardly urged float causes said first wings to urge said elastic blade outwardly thereby opening said discharge orifice.

20. The condensation discharger of claim 12 wherein:
said downwardly urged float causes said second wings to urge said elastic blade inwardly thereby causing said discharge orifice.

21. The condensation discharger of claim 19 wherein:
said downwardly urged float causes said second wings to urge said elastic blade inwardly thereby closing said discharge orifice.

22. The condensation discharge of claims 12 including:
vertical support means, said support means being attached to said tank collection means; and wherein:
a first end of said support means is attached to one end of said elastic blade and wherein a second end of said support means is attached to said second end of said arm.

* * * * *